(12) United States Patent
Ooba et al.

(10) Patent No.: US 11,036,191 B2
(45) Date of Patent: Jun. 15, 2021

(54) MACHINE LEARNING DEVICE, INDUSTRIAL MACHINE CELL, MANUFACTURING SYSTEM, AND MACHINE LEARNING METHOD FOR LEARNING TASK SHARING AMONG PLURALITY OF INDUSTRIAL MACHINES

(71) Applicant: FANUC CORPORATION, Yamanashi (JP)

(72) Inventors: Masafumi Ooba, Yamanashi (JP); Taketsugu Tsuda, Yamanashi (JP); Tomoki Oya, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 827 days.

(21) Appl. No.: 15/429,064

(22) Filed: Feb. 9, 2017

(65) Prior Publication Data
US 2017/0243135 A1 Aug. 24, 2017

(30) Foreign Application Priority Data
Feb. 19, 2016 (JP) .............................. JP2016-029605

(51) Int. Cl.
*G05B 13/02* (2006.01)
*G06N 20/00* (2019.01)
(Continued)

(52) U.S. Cl.
CPC ..... *G05B 13/0265* (2013.01); *G05B 19/4185* (2013.01); *G05B 19/41865* (2013.01);
(Continued)

(58) Field of Classification Search
CPC ........ G06N 20/00; G06N 3/006; G06N 3/084; G05B 19/4185; G05B 19/41865;
(Continued)

(56) References Cited

U.S. PATENT DOCUMENTS

2007/0179671 A1 8/2007 Arimatsu et al.
2008/0301072 A1 12/2008 Nagatsuka et al.
(Continued)

FOREIGN PATENT DOCUMENTS

| CN | 1514209 A | 7/2004 |
|---|---|---|
| CN | 102317044 A | 1/2012 |

(Continued)

OTHER PUBLICATIONS

Vijay Kumar, "Networked Robots" Springer Handbook of Robotics (Year: 2008).*
(Continued)

*Primary Examiner* — Ann J Lo
*Assistant Examiner* — Van C Mang
(74) *Attorney, Agent, or Firm* — Hauptman Ham, LLP

(57) ABSTRACT

A machine learning device, which performs a task using a plurality of industrial machines and learns task sharing for the plurality of industrial machines, includes a state variable observation unit which observes state variables of the plurality of industrial machines; and a learning unit which learns task sharing for the plurality of industrial machines, on the basis of the state variables observed by the state variable observation unit.

14 Claims, 7 Drawing Sheets

(51) Int. Cl.
*G05B 19/418* (2006.01)
*G06N 3/08* (2006.01)
*G06N 3/00* (2006.01)

(52) U.S. Cl.
CPC ............ *G06N 3/006* (2013.01); *G06N 3/084* (2013.01); *G06N 20/00* (2019.01); *G05B 2219/31264* (2013.01); *G05B 2219/33038* (2013.01); *G05B 2219/45104* (2013.01); *Y02P 90/02* (2015.11)

(58) Field of Classification Search
CPC ........... G05B 2219/31264; G05B 2219/33038; G05B 2219/45104; Y02P 90/18; Y02P 90/20
See application file for complete search history.

(56) References Cited

U.S. PATENT DOCUMENTS

| | | | |
|---|---|---|---|
| 2011/0288667 | A1 | 11/2011 | Noda et al. |
| 2013/0166621 | A1 | 6/2013 | Zhu |
| 2014/0148949 | A1 | 5/2014 | Graca et al. |
| 2014/0259613 | A1 | 9/2014 | Shiota et al. |
| 2014/0259615 | A1 | 9/2014 | Fukuda et al. |
| 2015/0316922 | A1* | 11/2015 | Rischar ............ G05B 19/41855 700/23 |
| 2016/0325439 | A1 | 11/2016 | Murakami et al. |

FOREIGN PATENT DOCUMENTS

| | | | |
|---|---|---|---|
| CN | 104057454 | A | 9/2014 |
| JP | 5-120300 | A | 5/1993 |
| JP | 2000-141147 | A | 5/2000 |
| JP | 2001-166803 | A | 6/2001 |
| JP | 2002-6934 | A | 1/2002 |
| JP | 2003-5817 | A | 1/2003 |
| JP | 2004-243461 | A | 9/2004 |
| JP | 2007-30087 | A | 2/2007 |
| JP | 2008-296330 | A | 12/2008 |
| JP | 2010-165265 | A | 7/2010 |
| JP | 4827731 | B2 | 11/2011 |
| JP | 2013-536095 | A | 9/2013 |
| JP | 2014-79819 | A | 5/2014 |
| JP | 2014-104581 | A | 6/2014 |
| JP | 2014-180706 | A | 9/2014 |
| JP | 2014-182407 | A | 9/2014 |
| JP | 2014-182470 | A | 9/2014 |
| JP | 2015-112656 | A | 6/2015 |
| WO | 2004/113030 | A1 | 12/2004 |

OTHER PUBLICATIONS

Yeung, "Adaptive Load Balancing Between Mobile Robots Through Learning in an Artificial Neural System" IEEE pp. 2299-2304 (Year: 1988).*

Dahl, "Multi-robot task allocation through vacancy chain scheduling", Elsevier pp. 674-687 (Year: 2008).*

Vijay Kumar, "Networked Robots" Springier Handbook of Robotics, 2008 (Year: 2008).*

Yeung, "Adaptive Load Balancing Between Mobile RObots Trhough Learning in an Artificial Neural System" IEE pp. 2290-2304, 1988 (Year: 1988).*

Chilimbi, "Project Adam: Building an Efficient and Scalable Deep Learning Training System" pp. 571-582 (Year: 2014).*

Dahl, "Multi-robot task alocation through vacancy chain scheduling", Elsevier pp. 674-687, 2008 (Year: 2008).*

Nils Napp, "Load Balancing for Multi-Robot Construction", IEEE, May 9-13, 2011, Shanghai, China (Year: 2011).*

"Industry 4.0 is not scary robot, eds.", Nikkei Monozukuri, Sep. 1, 2015, pp. 42-44, No. 732, Nikkei BP, Japan.

Koji Iwamura et al, "Applying Multi-agent Reinforcement Learning to Autonomous Distributed Real-time Scheduling", The Institute of Systems, Control and Information Engineers, Apr. 15, 2013, pp. 129-137, vol. 26, No. 4, Japan, included in Systems, Control and Information 2013 vol. 57, No. 4.

Lijie "Task Assignment of Handling System with Multiple Robots", Master's Thesis, Hefei University of Technology, Nov. 15, 2008, pp. 9-46, Issue 11, V. 1, China.

* cited by examiner

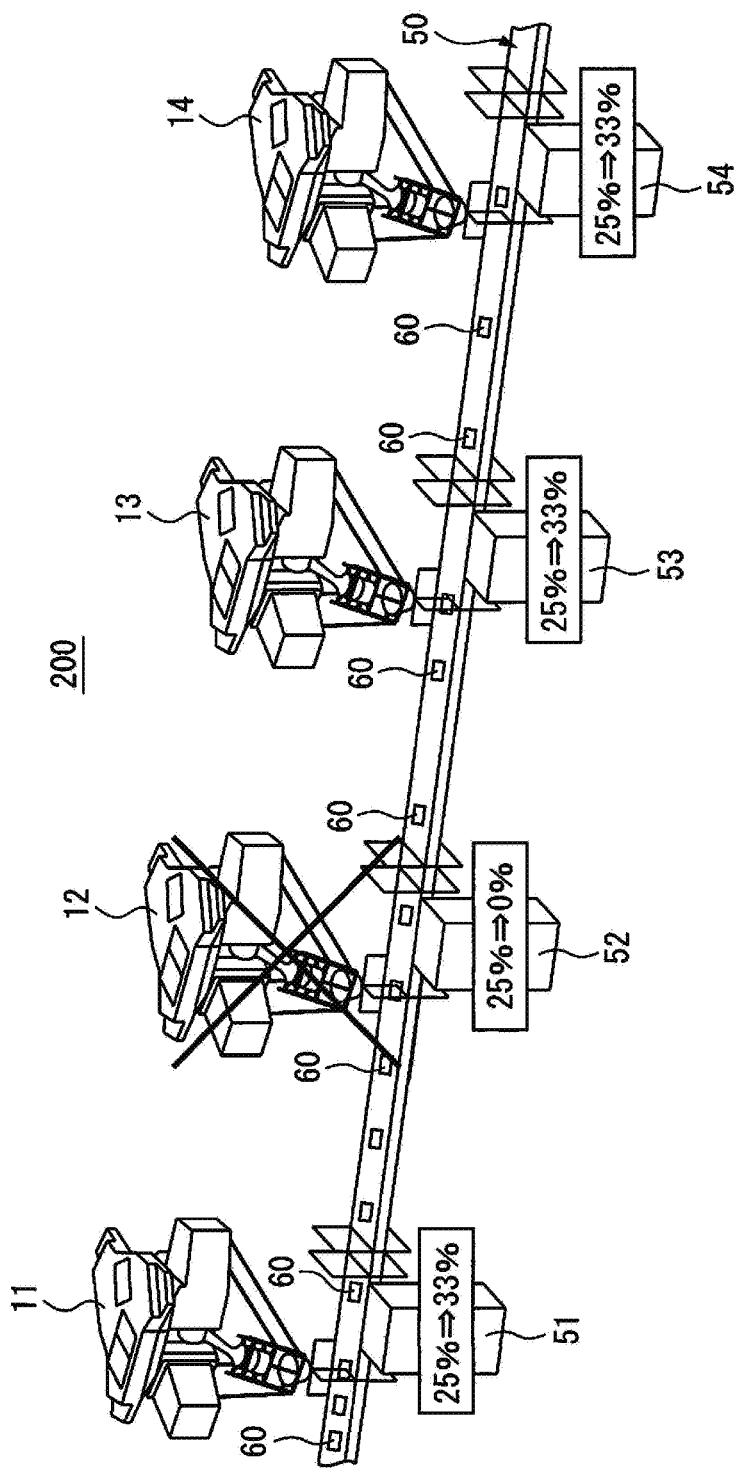

MACHINE LEARNING DEVICE, INDUSTRIAL MACHINE CELL, MANUFACTURING SYSTEM, AND MACHINE LEARNING METHOD FOR LEARNING TASK SHARING AMONG PLURALITY OF INDUSTRIAL MACHINES

RELATED APPLICATIONS

The present application claims priority to Japanese Patent Application Number 2016-029605 filed Feb. 19, 2016, the disclosure of which is hereby incorporated by reference herein in its entirety.

BACKGROUND OF THE INVENTION

1. Field of the Invention

The present invention relates to a machine learning device, an industrial machine cell, a manufacturing system, and a machine learning method for learning task sharing among a plurality of industrial machines.

2. Description of the Related Art

Conventionally, an industrial machine cell which includes a plurality of industrial machines such as robots and performs tasks using the plurality of industrial machines, for example, has come into practical use. Under the circumstances, a configuration has been proposed which computes the total number of unprocessed workpieces and reallocates at least one workpiece from a machine having processed a large total number of workpieces to a machine having processed a small total number of workpieces to uniform the load on each machine (e.g., Japanese Patent No. 4827731: patent literature 1).

To allow efficient handling of articles even when the operation routes of robots or the conveyance interval of articles changes, another configuration has been conventionally proposed which defines, in advance, the numbers of workpieces to be handled by a robot controlled by each controller and workpieces not to be handled and determines whether the workpieces are to be handled on the basis of the defined numbers (e.g., Japanese Laid-Open Patent Publication No. 2008-296330: patent literature 2).

Still another configuration has been conventionally proposed which, upon presetting of information concerning workpieces or components and information concerning robots, distributes tasks to a plurality of robots for predetermined work and determines the order in which they are operated to avoid collision and optimize the work (e.g., Japanese Laid-Open Patent Publication No. 2004-243461: patent literature 3).

Still another configuration has been conventionally proposed which performs task allocation simulation on a production line in anticipation that each spot welding gun will become inoperative due, e.g., to failure of any welding robot (e.g., Japanese Laid-Open Patent Publication No. 2000-141147: patent literature 4).

Robots to be employed may be not only robots which perform manufacturing tasks but also various robots such as a logistical tracking device which transfers articles on a transport conveyor (conveyor) (e.g., Japanese Laid-Open Patent Publication No. 2007-030087: patent literature 5).

As described above, a variety of proposals have been conventionally presented, but, for example, as in patent literature 1, when task sharing of a particular task to be shared among a plurality of robots and performed is determined to uniform the task volume for each robot, or, as in patent literature 2, when the number of workpieces to be processed by tasks are determined in advance and then it is determined whether to perform the tasks, a task that exceeds the capacity of any robot may occur due to factors associated with the state unique to each robot (e.g., the difference in task area or task detail). The occurrence of a task that exceeds the capacity (allowable value) of any robot results in workpiece misses or imperfect task execution.

To prevent such a problem, it is possible to determine, in advance, the task ratio (the volume of a task shared by each robot) in consideration of the state unique to each robot or dynamically control the task ratio. However, since an enormous number of combinations of conditions such as the task details of a plurality of robots exist, it is practically difficult to, e.g., determine the task ratio in advance or dynamically control the task ratio by generating a program for changing the task ratio in advance.

The above-described problem is conspicuous when, for example, any robot stops during production for some reason, and the remaining robots share tasks and continue production. In this case, as in, e.g., patent literature 1, it is possible to uniformly share tasks among the remaining robots, but the occurrence of a task that exceeds the capacity of any robot may result in a large number of workpiece misses or imperfect task execution, as described above.

Further, for example, in a system which performs spot welding using a plurality of robots, when any robot within the system stops for some reason, the task of the stopped robot may be preferably shared among the remaining robots. However, in, e.g., patent literature 3, since information concerning the robots may be preferably input before tasks are input, when any robot stops, the tasks are redistributed upon updating of the robot information to reconfigure task optimization, the OFF time of the overall system may increase.

In, e.g., patent literature 4, simulation is performed so that when each robot stops, the remaining robots can share tasks, but a problem arises in terms not only of involving the man-hour for preliminary simulation but also of permitting only behaviors based on the simulation results.

In consideration of the above-described problems of the conventional techniques, it is an object of the present invention to provide a machine learning device, an industrial machine cell, a manufacturing system, and a machine learning method which can optimize task sharing among a plurality of industrial machines.

SUMMARY OF INVENTION

According to a first aspect of the present invention, there is provided a machine learning device which performs a task using a plurality of industrial machines and learns task sharing for the plurality of industrial machines, the device including a state variable observation unit which observes state variables of the plurality of industrial machines; and a learning unit which learns task sharing for the plurality of industrial machines, on the basis of the state variables observed by the state variable observation unit.

The machine learning device may further include a decision unit which decides and issues, as a command, a sharing detail of the task for the plurality of industrial machines by referring to the task sharing learned by the learning unit. The machine learning device may be connected to each of the plurality of industrial machines via a network, the state variable observation unit may obtain the state variables of the plurality of industrial machines via the network, and the decision unit may send the sharing detail of the task to the plurality of industrial machines via the network.

The state variable observation unit may observe at least one of a task time from start to end of a series of tasks repeatedly performed by the plurality of industrial machines, and a task load on each of the plurality of industrial machines in an interval from the start to the end of the tasks, or may observe at least one of an achievement level of the tasks performed by the plurality of industrial machines and a difference in task volume in each of the plurality of industrial machines. The state variable observation unit may further obtain at least one of a change in production volume in an upstream process, and a change in production volume upon stop of the industrial machine for maintenance performed periodically.

The learning unit may learn task sharing for maintaining a volume of production by the plurality of industrial machines, averaging a load on each of the plurality of industrial machines, and maximizing a volume of the task performed by the plurality of industrial machines. Further, each of the plurality of industrial machines may include a robot, and the plurality of robots may perform the task on the basis of the learned task sharing.

The machine learning device may include a reward computation unit which computes a reward on the basis of output from the state variable observation unit; and a value function update unit which updates a value function for determining a value of task sharing for the plurality of industrial machines, in accordance with the reward on the basis of output from the state variable observation unit and output from the reward computation unit. Further, the learning unit may include an error computation unit which computes an error on the basis of input teacher data and output from the state variable observation unit; and a learning model update unit which updates a learning model for determining an error of task sharing for the plurality of industrial machines, on the basis of output from the state variable observation unit and output from the error computation unit. The machine learning device may further include a neural network.

According to a second aspect of the present invention, there is provided an industrial machine cell including the plurality of industrial machines; and the machine learning device of the above described first aspect.

According to a third aspect of the present invention, there is provided a manufacturing system including a plurality of industrial machine cells of the above described second aspect, wherein the machine learning devices are provided in correspondence with the industrial machine cells, and the machine learning devices provided in correspondence with the industrial machine cells are configured to share or exchange data with each other via a communication medium. The machine learning device may be located on a cloud server.

According to a fourth aspect of the present invention, there is provided a machine learning method for performing a task using a plurality of industrial machines and learning task sharing for the plurality of industrial machines, the method including observing state variables of the plurality of industrial machines; and learning task sharing for the plurality of industrial machines, on the basis of the observed state variables. The observing the state variables may include one of observing at least one of a task time from start to end of a series of tasks repeatedly performed by the plurality of industrial machines, and a task load on each of the plurality of industrial machines in an interval from the start to the end of the tasks, and observing at least one of an achievement level of the tasks performed by the plurality of industrial machines and a difference in task volume in each of the plurality of industrial machines.

BRIEF DESCRIPTION OF THE DRAWINGS

The present invention will be more clearly understood by reference to the accompanying drawings, in which:

FIG. 9 is a view for explaining an exemplary process when one industrial machine stops in an industrial machine cell.

DETAILED DESCRIPTION

Figure 1:
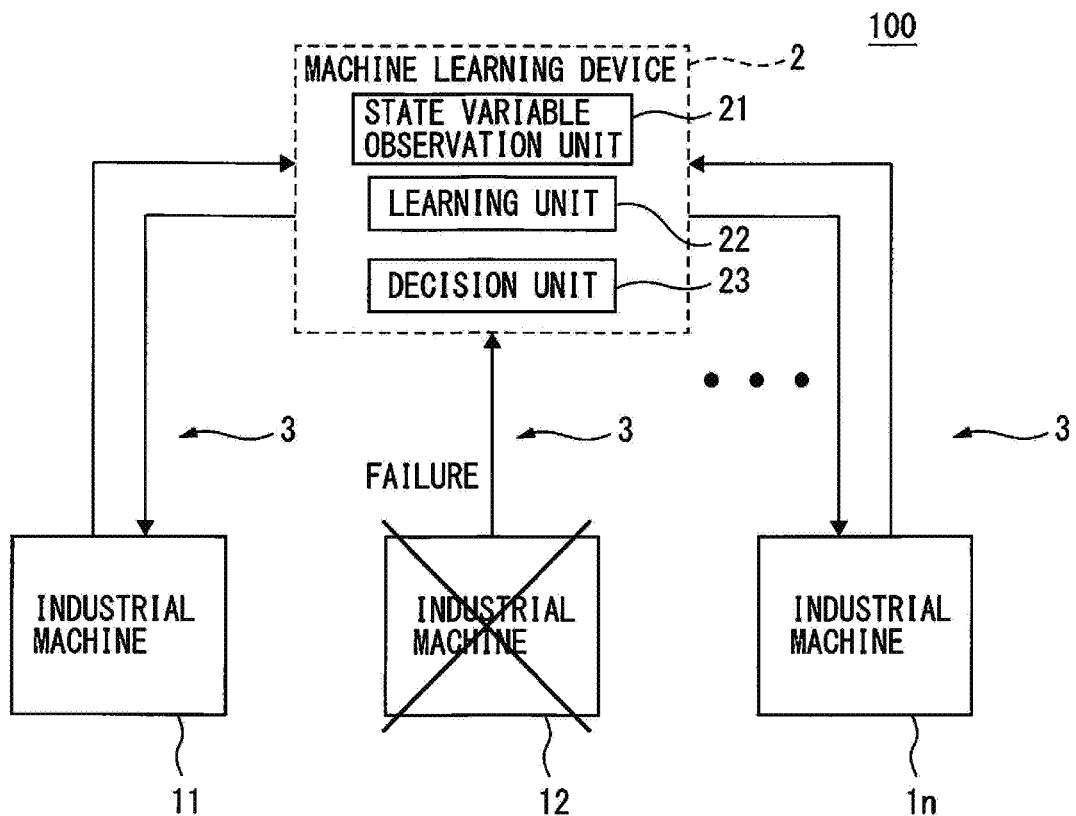
FIG. 1 is a block diagram illustrating an embodiment of an industrial machine cell according to the present invention.

Before a detailed description of an embodiment of a machine learning device, an industrial machine cell, a manufacturing system, and a machine learning method according to the present invention, an exemplary process of an industrial machine cell when one industrial machine stops, for example, will be described first with reference to FIG. 9. FIG. 9 is a view for explaining an exemplary process when one industrial machine stops in an industrial machine cell. Referring to FIG. 9, reference numerals 11 to 14 denote industrial machines (robots); 50, a conveyor (transport conveyor); 51 to 54, workpiece mounting units; 60, workpieces; and 200, an industrial machine cell.

As depicted as FIG. 9, the industrial machine cell 200 includes a plurality of robots 11 to 14, which are respectively configured to sequentially pick up the workpieces 60 successively conveyed by the conveyor 50 and place them on the upper surfaces of the corresponding workpiece mounting units 51 to 54. Note that FIG. 9 illustrates the case where, for example, one robot 12 stops for maintenance and the remaining three robots 11, 13, and 14 perform the same tasks as those of the four robots 11 to 14.

Assuming, for example, that the task capacities (processing capacities) of the robots 11 to 14 and the task details (processing details) of the robots 11 to 14 are the same, and the task of the industrial machine cell 200 is performed as repetitions of the same tasks, when the task of the overall industrial machine cell 200 performed by the four robots 11 to 14 is 100%, the task performed by each of the robots 11 to 14 is 25%. When one robot 12 stops and the remaining three robots 11, 13, and 14 perform tasks, the task performed by each of the robots 11, 13, and 14 increases from 25% to about 33%.

However, it is, in practice, rare that the robots 11 to 14 in the industrial machine cell 200, for example, all perform the same tasks, and the task area of each robot is often different. Therefore, when one robot 12 of the four robots 11 to 14 stops, even uniform allocation of the task of the robot 12 to the remaining three robots 11, 13, and 14 may quite rarely provide optimal task sharing. Further, for example, in a predetermined robot, the occurrence of a task that exceeds the capacity of the robot may result in workpiece misses or imperfect task execution.

It is also possible to provide a margin so as not to exceed the capacity of any robot, but providing a margin to each robot amounts to hindering them from exhibiting their intrinsic production capacities, thus leading to productivity losses in the industrial machine cell.

It is further possible to determine the task ratio in advance in consideration of the state unique to each robot or dynamically control the task ratio, but since an enormous number of combinations of conditions such as the task details of a plurality of robots exist, it is difficult to perform tasks upon task sharing optimum for each robot to maximize the production volume of the overall industrial machine cell 200.

An embodiment of a machine learning device, an industrial machine cell, a manufacturing system, and a machine learning method for learning task sharing among a plurality of industrial machines according to the present invention will be described in detail below with reference to the accompanying drawings. FIG. 1 is a block diagram illustrating an embodiment of an industrial machine cell according to the present invention.

An industrial machine cell 100 includes a plurality of industrial machines 11 to 13 which perform tasks, and a machine learning device 2 which learns task sharing (task ratio (load balance)) for the plurality of industrial machines 11 to 13, as illustrated as FIG. 1. Although FIG. 1 illustrates only the three industrial machines 11 to 13 for the sake of simplicity, the number of industrial machines is not limited to three and various cases are possible, as a matter of course. The industrial machines are not limited to industrial and service robots and may be implemented in machine tools such as lathes, drill presses, boring machines, milling machines, grinders, gear cutters/gear finishing machines, machining centers, electric discharge machines, punch presses, laser beam machines, conveyors, and plastic injection molding machines.

The machine learning device 2 includes a state variable observation unit 21, a learning unit 22, and a decision unit 23, as depicted as FIG. 1. The state variable observation unit 21 observes state variables of the plurality of industrial machines 11 to 13, and the learning unit 22 learns task sharing for the plurality of industrial machines 11 to 13, on the basis of the state variables observed by the state variable observation unit 21. The decision unit 23 decides and issues, as a command, sharing details of the tasks for the plurality of industrial machines 11 to 13 by referring to the task sharing learned by the learning unit 22.

The machine learning device 2 is, for example, connected to each of the plurality of industrial machines 11 to 13 via a network 3. The state variable observation unit 21 is configured to obtain the state variables of the plurality of industrial machines 11 to 13 via the network, and the decision unit 23 is configured to send the sharing details of the tasks to the plurality of industrial machines 11 to 13 via the network. Note that the learning unit 22 learns task sharing for, e.g., maintaining the volume of production by the plurality of industrial machines 11 to 13, averaging the load on each of the plurality of industrial machines 11 to 13, and maximizing the volumes of the tasks performed by the plurality of industrial machines 11 to 13.

Figure 2:
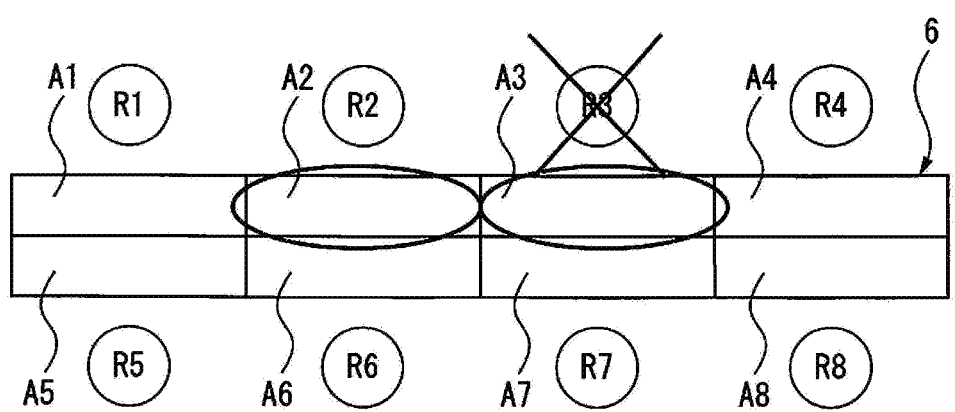
FIG. 2 is a diagram for explaining exemplary tasks performed using the industrial machine cell illustrated as FIG. 1.

FIG. 2 is a diagram for explaining exemplary tasks performed using the industrial machine cell illustrated as FIG. 1 and serves to explain an industrial machine cell which performs spot welding using a plurality of robots R1 to R8 on workpieces 6. Referring to FIG. 2, reference numerals A1 to A8 denote areas where the respective robots R1 to R8 perform spot welding on workpieces 6 such as automobiles during normal operation (when the robot R3 is also in operation). When, for example, the robot R3 is kept stopped for, e.g., maintenance, the welding points (spot-welded portions) of the area A3 processed by the robot R3 are shared among, e.g., the robots R2, R4, and R7 (R6 and R8) located around the robot R3, and the welding points of the area A2 processed by the robot R2 during normal operation are also shared between, e.g., the robots R1 and R6 (R5 and R7) located around the robot R2.

The machine learning device 2 (4) according to the present embodiment is, for example, configured to, when one robot R3 in an industrial machine cell including eight robots R1 to R8 stops, learn tasks to be shared among the remaining seven robots R1, R2, and R4 to R8 to optimize task sharing among the robots R1, R2, and R4 to R8. The industrial machine cell (100) of the present embodiment may be, for example, configured to perform spot welding using the plurality of robots R1 to R8 on workpieces 6 such as automobiles, as depicted as FIG. 2, but it may be configured to sequentially perform tasks for the workpieces 60 successively conveyed by the conveyor 50, using the plurality of robots 11 to 14 as described with reference to FIG. 9.

In other words, the machine learning device 2 (4) according to the present embodiment is widely applicable to industrial machine cells having various configurations. In addition, various industrial robots or machine tools can be used as industrial machines, and the industrial robots, machine tools, and the like may be mixed as an industrial machine cell as appropriate, as a matter of course. The machine learning device may employ various types of machine learning, including the machine learning device 2 that employs "reinforcement learning (Q-learning)" to be described below with reference to FIG. 5 and FIG. 6, and the machine learning device 4 that employs "supervised learning" to be described below with reference to FIG. 7.

More specifically, the machine learning device has the function of extracting, e.g., a useful rule, a knowledge representation, and a determination criterion by analysis from a set of data input to the device, outputting the determination results, and learning knowledge (machine learning). A variety of machine learning techniques are available, which are roughly classified into, e.g., "supervised learning," "unsupervised learning," and "reinforcement learning." To implement these techniques, another technique called "deep learning" in which extraction of feature values themselves is learned is available.

Figure 5:
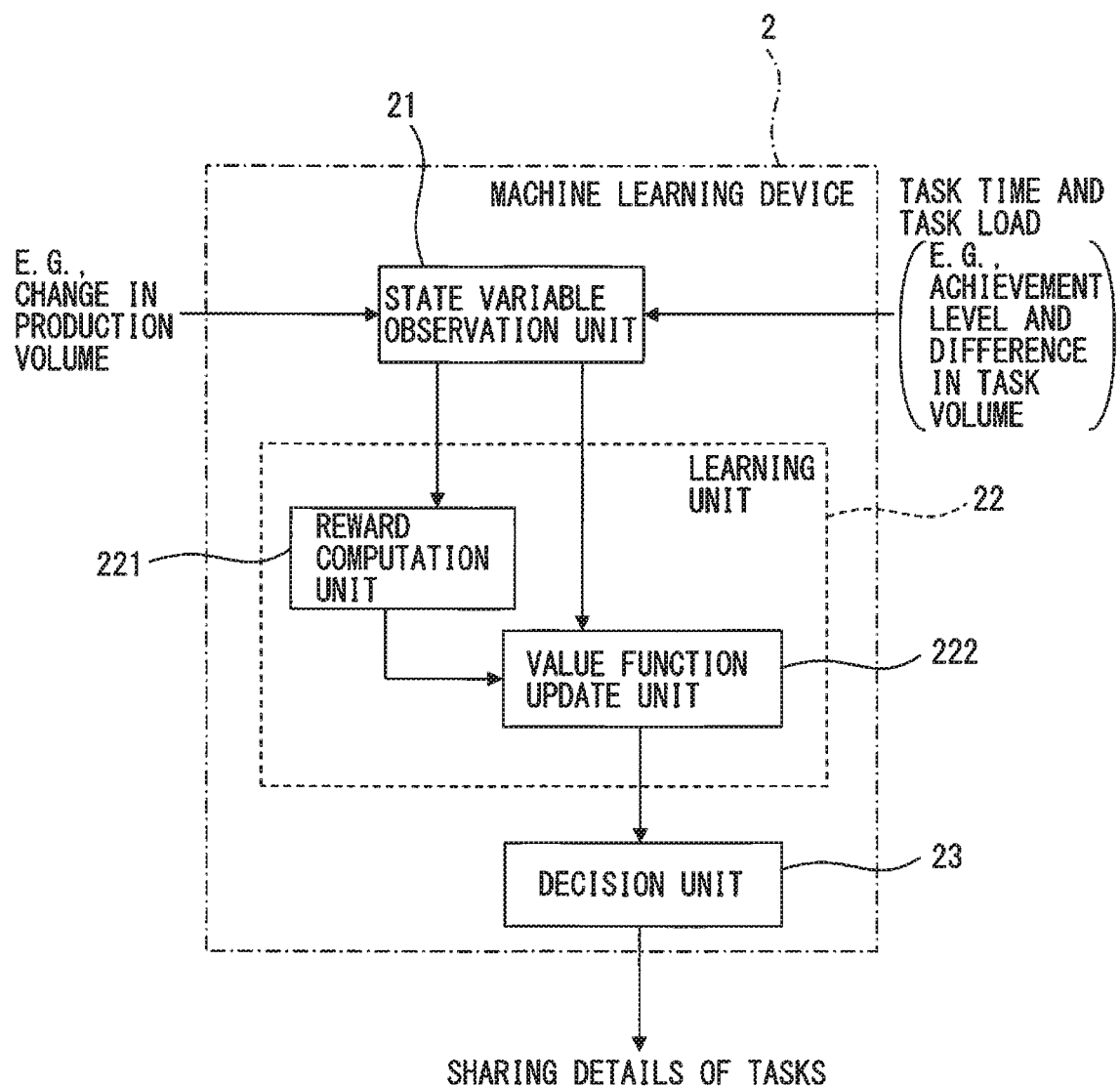
FIG. 5 is a block diagram illustrating an example of a machine learning device according to the present invention.
Figure 7:
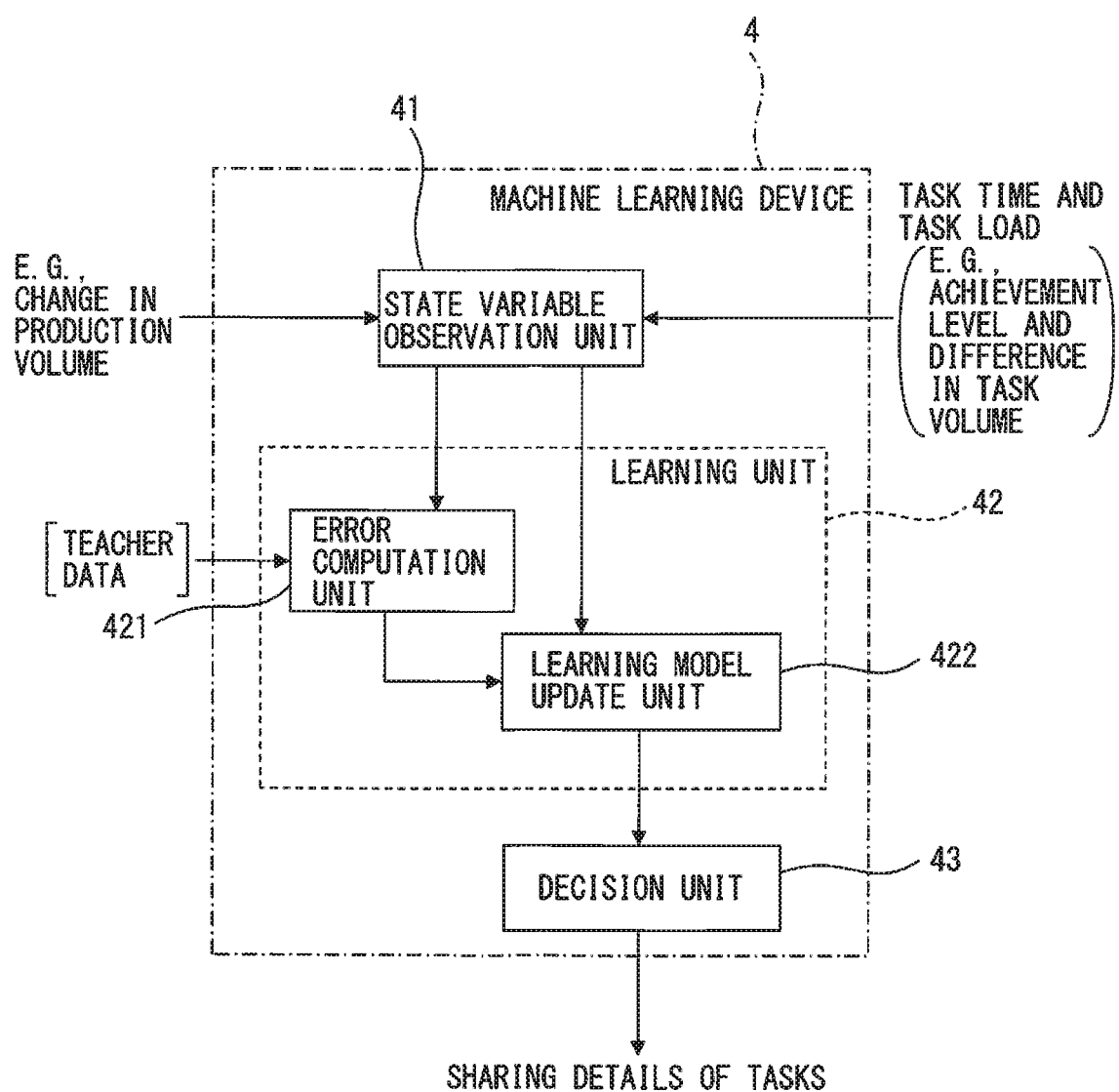
FIG. 7 is a block diagram illustrating another example of a machine learning device according to the present invention.

As described above, the machine learning device 2 illustrated as FIG. 5 exemplifies "reinforcement learning (Q-learning)" and the machine learning device 4 illustrated as FIG. 7 exemplifies "supervised learning." Although the machine learning devices 2 and 4 (machine learning) may use a general-purpose computer or processor, the use of, e.g., GPGPU (General-Purpose computing on Graphics Processing Units) or large-scale PC clusters allows higher-speed processing.

First, in supervised learning, a large number of sets of teacher data, i.e., data of certain inputs and results (labels) are fed into a machine learning device to learn features seen in these data sets and inductively acquire a model (error model) for estimating the result from the input, i.e., their relationship. Supervised learning can be implemented using an algorithm such as a neural network (to be described later).

In unsupervised learning, only input data are fed into a machine learning device in large amounts to learn the distribution of the input data to, e.g., compress, classify, and shape the input data without corresponding teacher output data. This allows, e.g., clustering of features seen in these data sets into similar features. The obtained result can be used to define some norm and allocate outputs to optimize it, thus predicting output.

Intermediate problem setting between unsupervised learning and supervised learning, called semi-supervised learning, is also available and applies when, for example, only some data serve as data sets of inputs and outputs and the remaining data include only inputs. In the present embodiment, learning can be efficiently performed by applying data (e.g., image data or simulation data) which can be obtained even without actual movement of an industrial machine cell (a plurality of industrial machines) to unsupervised learning.

Reinforcement learning will be described below. Reinforcement learning problem setting will be considered as follows:

An industrial machine cell (i.e., a plurality of industrial machines (e.g., a plurality of robots or a plurality of machine tools)) observes the environmental state to decide its action;

The environment may change according to any rule and the industrial machine cell may change the environment by its own action;

A reward signal is returned every time an action is taken;

The sum of (discount) rewards in the future is to be maximized;

Learning starts in the state in which a result brought about by the action is totally unknown or known only incompletely. In other words, the numerical controller can obtain the result of the action as data only after it actually takes action. This means that an optimal action may be preferably searched for by trial and error; and Learning can be started at a good starting point assuming that the state in which learning has been performed in advance to imitate human behaviors (a technique such as the above-mentioned supervised learning or reverse reinforcement learning) is initial.

In reinforcement learning, in addition to determination and classification, an action is learned to acquire a method for learning an appropriate action in consideration of interactions exerted on the environment by the action, i.e., learning to maximize the reward to be obtained in the future. Although this description will be followed by an example of Q-learning, the present invention is not limited to Q-learning.

In Q-learning, a value Q(s, a) of selecting an action a is learned in a particular environmental state s. In other words, an action a having the highest value Q(s, a) in the particular state s may be preferably selected as an optimal action. However, at first, a correct value of the value Q(s, a) is totally unknown for a pair of the state s and the action a. The agent (the subject of an action) selects various actions a in the particular state s and rewards are offered for the actions a. With this operation, the agent learns to select a better action, i.e., a correct value Q(s, a).

To maximize the sum of rewards to be obtained in the future as a result of the actions, $Q(s, a)=E[\Sigma(\gamma^t)r_t]$ is to be finally satisfied. Note that the expected value is taken in response to a change in state that follows an optimal action and is an unknown value, which is learned by a search. An update expression of such a value Q(s, a) is given by, e.g.:

$$Q(s_t, a_t) \leftarrow Q(s_t, a_t) + \alpha\left(r_{t+1} + \gamma \max_a Q(s_{t+1}, a) - Q(s_t, a_t)\right) \quad (1)$$

where $s_t$ is the environmental state at time t and $a_t$ is the action at time t. Upon the action $a_t$, the state changes to $s_{t+1}$. $r_{t+1}$ is the reward received upon a change in state. The term attached with max is the product of the Q-value multiplied by γ when an action a having the highest Q-value known in the state $s_{t+1}$ is selected. γ is a parameter called the discount rate, satisfying 0<γ≤1. α is a learning factor satisfying 0<α≤1.

Expression (1) represents a method for updating the evaluation value $Q(s_t, a_t)$ of the action $a_t$ in the state $s_t$, based on the reward $r_{t+1}$ returned as a result of the trial $a_t$. More specifically, when the sum of the reward $r_{t+1}$ and the evaluation value $Q(s_{t+1}, \max a_{t+1})$ of the best action max a in the state subsequent to the state s upon the action a is greater than the evaluation value $Q(s_t, a_t)$ of the action a in the state s, $Q(s_t, a_t)$ is increased; otherwise, $Q(s_t, a_t)$ is reduced. In other words, the value of a particular action in a particular state is brought close to the reward immediately returned as a result, and the value of the best action in the subsequent state upon the particular action.

Methods for representing Q (s, a) on the computer include a method for holding the numerical values of all state-action pairs (s, a) in the form of a table and a method for providing a function that approximates Q(s, a). With the latter method, the above-mentioned expression (1) can be implemented by adjusting the parameter of an approximation function using a technique such as the stochastic gradient descent method. A neural network (to be described later) can be used as the approximation function.

Figure 3:
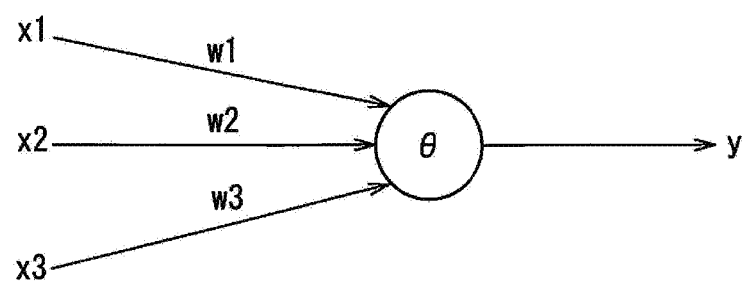
FIG. 3 is a diagram schematically representing a model for a neuron.
Figure 4:
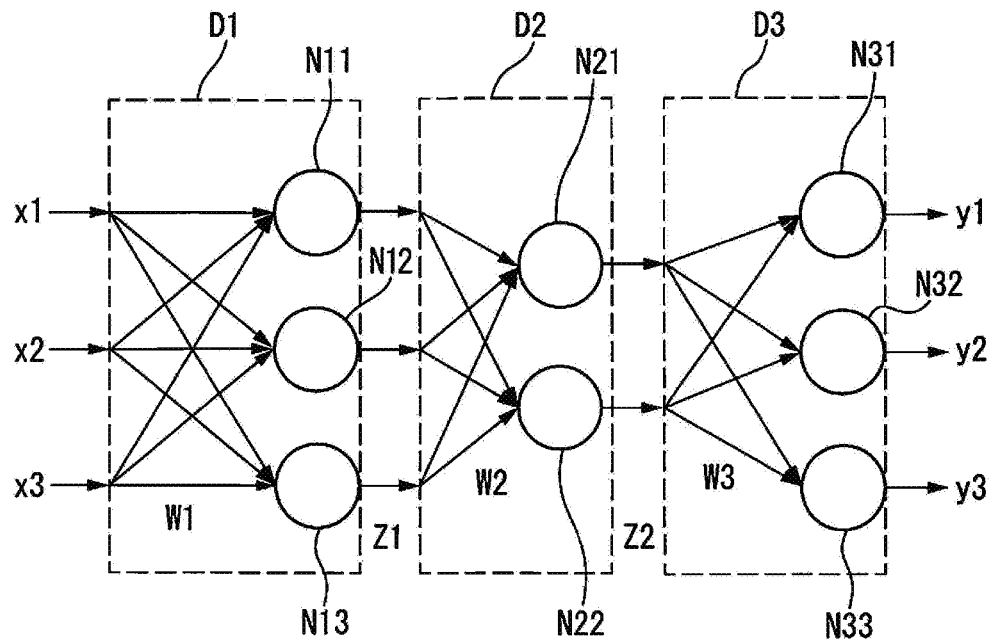
FIG. 4 is a diagram schematically representing a three-layer neural network formed by combining neurons as illustrated as FIG. 3 together.

Neural networks can also be used as approximation algorithms for value functions in reinforcement learning. FIG. 3 is a diagram schematically representing a model for a neuron, and FIG. 4 is a diagram schematically representing a three-layer neural network formed by combining neurons as illustrated as FIG. 3 together. More specifically, the neural network is implemented by, e.g., an arithmetic device imitating a model for a neuron as illustrated as, e.g., FIG. 3, and a memory.

As illustrated as FIG. 3, the neurons serve to output, output (result) y for a plurality of inputs x (FIG. 3 illustrates inputs x1 to x3 as an example). Each input x (x1, x2, x3) is multiplied by a weight W (W1, W2, W3) corresponding to the input x. With this operation, the neurons output results y given by:

$$y = f_k(\Sigma^n_{i=1} x_i w_i - \theta) \quad (2)$$

where θ is the bias and $f_k$ is the activation function. Note that all of the input x, the result y, and the weight w are vectors.

A three-layer neural network formed by combining neurons as illustrated as FIG. 3 together will be described below with reference to FIG. 4. A plurality of inputs x (inputs x1 to x3 are taken as an example herein) are input from the left of the neural network and results y (results y1 to y3 are taken as an example herein) are output from the right of this network, as illustrated as FIG. 4. More specifically, the inputs x1, x2, and x3 are multiplied by a weight corresponding to each of them and input to three neurons N11 to N13. The weights used to multiply these inputs are collectively denoted by W1 herein.

The neurons N11 to N13 output z11 to z13, respectively. Referring to FIG. 4, z11 to z13 are collectively referred to as feature vectors Z1 and may be regarded as vectors obtained by extracting the feature values of input vectors. The feature vectors Z1 are defined between the weights W1 and W2. z11 to z13 are multiplied by a weight corresponding to each of them and input to two neurons N21 and N22. The weights used to multiply these feature vectors are collectively denoted by W2 herein.

The neurons N21 and N22 output z21 and z22, respectively. Referring to FIG. 4, z21 and z22 are collectively referred to as feature vectors Z2. The feature vectors Z2 are defined between the weights W2 and W3. z21 and z22 are multiplied by a weight corresponding to each of them and input to three neurons N31 to N33. The weights used to multiply these feature vectors are collectively denoted by W3 herein.

Lastly, the neurons N31 to N33 output results y1 to y3, respectively. The operation of the neural network includes a learning mode and a value prediction mode. For example, the weight W is learned using a learning data set in the learning mode, and the action of a numerical controller is determined in the prediction mode using the parameter. Although "prediction" has been referred to above for the sake of convenience, a variety of tasks such as detection, classification, and inference are possible, as a matter of course.

Data obtained by actually operating the numerical controller in the prediction mode can be immediately learned and reflected on the subsequent action (online learning), or a group of data collected in advance can be used to perform collective learning and since then the detection mode can be executed using the same parameters (batch learning). As another, intermediate approach, the learning mode can be interposed every time a certain amount of data is accumulated.

The weights W1 to W3 can be learned by the error backpropagation method. The information of errors enters from the right and flows to the left. The error backpropagation method is used to adjust (learn) each weight to reduce the difference between the true output y (teacher) and the output y when the input x is input, for each neuron. Such a neural network can have more than three layers (called deep learning). It is possible to extract features of the input stepwise to automatically acquire an arithmetic device which returns a result, from only teacher data.

FIG. 5 is a block diagram illustrating an example of a machine learning device according to the present invention, and illustrates a machine learning device that employs "reinforcement learning (Q-learning)." The machine learning device 2 according to the present example includes, e.g., a state variable observation unit 21, a learning unit 22, and a decision unit 23 to execute Q-learning. However, the machine learning method applied to the present invention is not limited to Q-learning. Machine learning (machine learning device 2) can be implemented by adopting, e.g., GPGPU or large-scale PC clusters, as mentioned earlier.

The machine learning device 2 includes a state variable observation unit 21, a learning unit 22, and a decision unit 23, and the learning unit 22 includes a reward computation unit 221 and a value function update unit 222, as depicted as FIG. 5. The state variable observation unit 21 observes state variables of a plurality of industrial machines (e.g., the robots R1 to R8) and more specifically observes, e.g., the task time (overall task time) from the start to the end of a series of tasks repeatedly performed by the plurality of industrial machines, and the task load (e.g., the load of the power consumption or the like of each robot) on each of the plurality of industrial machines in the interval from the start to the end of the tasks.

Alternatively, the state variable observation unit 21 may observe the achievement level of the tasks performed by the plurality of industrial machines, and the difference in task volume in each of the plurality of industrial machines. Examples of the achievement level of the tasks performed by the plurality of industrial machines include the number of workpiece misses, and examples of the difference in task volume in each of the plurality of industrial machines include the differences in number of workpieces processed by each industrial machine and that in number of welding points.

The state variable observation unit 21 may observe one of the overall task time and the task load on each robot, or one of the achievement level of the tasks performed by the plurality of industrial machines and the difference in task volume in each of the plurality of industrial machines. The state variable observation unit 21 may further observe the overall task time and the task load on each robot, and the achievement level of the tasks performed by the plurality of industrial machines and the difference in task volume in each of the plurality of industrial machines. The state variable observation unit 21 may further obtain (observe), e.g., at least one of a change in production volume in the upstream process of the tasks performed by the industrial machine cell (100), and a change in production volume upon the stop of the industrial machine for maintenance performed periodically.

The reward computation unit 221 computes a reward on the basis of output from the state variable observation unit 21, and the value function update unit 222 updates a value function for determining the value of task sharing for the plurality of industrial machines, in accordance with the reward on the basis of output from the state variable observation unit 21 and output from the reward computation unit 221.

Figure 6:
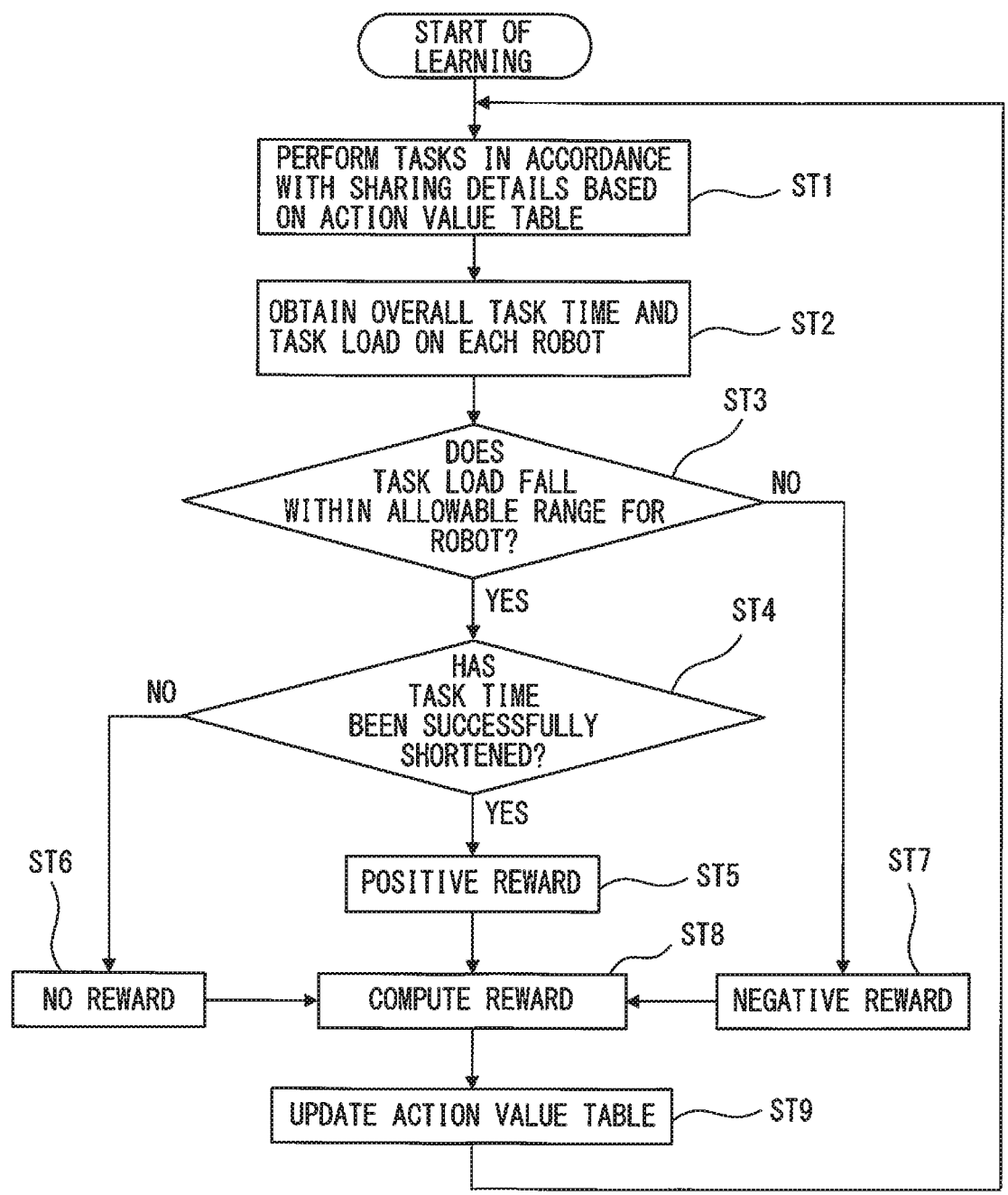
FIG. 6 is a flowchart for explaining an exemplary operation of the machine learning device illustrated as FIG. 5.

FIG. 6 is a flowchart for explaining an exemplary operation of the machine learning device illustrated as FIG. 5, and illustrates an example in which the state variable observation unit 21 obtains the overall task time and the task load on each robot, mentioned above. As illustrated as FIG. 6, when machine learning is started (at the start of learning), tasks are performed in accordance with sharing details based on the action value table (step ST1). In other words, a plurality of industrial machines (e.g., the industrial machines 11 to in illustrated as FIG. 1 or the robots R1 to R8 illustrated as FIG. 2) included in the industrial machine cell 100 perform tasks based on the sharing details of the tasks output from the machine learning device 2 (decision unit 23), and the process advances to step ST2.

In step ST2, the task time (i.e., the overall task time of the industrial machine cell 100) from the start to the end of a series of tasks repeatedly performed by the plurality of industrial machines (e.g., the robots R1 to R8), and the task load on each of the plurality of industrial machines (i.e., the task load on each of the robots R1 to R8) in the interval from the start to the end of the tasks are obtained and the process advances to step ST3. When, for example, the robot R3 is kept stopped, information indicating that the task load on the robot R3 kept stopped is zero, for example, is obtained in step ST2. Obtaining of the task load on each robot is not limited to obtaining from each robot via a network, and various forms may be available, such as notification of an alarm output from a robot stopped due to failure, or a host controller which designates a robot to be stopped for maintenance.

It is determined in step ST3 whether the task load falls within an allowable range for the robot, and when it is determined that the task load falls within the allowable range (YES in step ST3), the process advances to step ST4, in which it is determined whether the task time has been successfully shortened, or when it is determined that the task load falls outside the allowable range (NO in step ST3), the process advances to step ST7, in which a negative reward is set. In other words, a negative reward is set because it is not preferable to allow the task load to exceed the load permitted by the robot.

In step ST4, when it is determined that the task time (the overall task time of the industrial machine cell 100) has been successfully shortened (YES in step ST4), the process advances to step ST5, in which a positive reward is set; otherwise (NO in step ST4), the process advances to step ST6, in which "no reward" (zero reward) is set. The process then advances to step ST8, in which a reward is computed using the "positive reward," the "no reward," and the "negative reward" in steps ST5, ST6, and ST7, and the process advances to step ST9, in which the action value table is updated. The process then returns to step ST1, in which the same processes are repeated. Thus, task sharing among a plurality of robots (industrial machines) can be optimized.

In the foregoing description, the industrial machine cell 100 (200) is not limited to a configuration which performs spot welding on workpieces 6, such as automobiles, as depicted as FIG. 2, or a configuration which sequentially picks up the workpieces 60 successively conveyed by the conveyor 50, as depicted as FIG. 9, and it is widely applicable to various configurations such as a logistical tracking device which transfers articles on a conveyor. Appropriate values (magnitudes) of the "positive reward," the "no reward," and the "negative reward" in the abovementioned steps ST5, ST6, and ST7 are selected in accordance with various conditions, as a matter of course.

FIG. 7 is a block diagram illustrating another example of a machine learning device according to the present invention, and illustrates a machine learning device that employs supervised learning. As is obvious from a comparison of FIG. 7 with FIG. 5 mentioned earlier, the machine learning device 4 that employs supervised learning illustrated as FIG. 7 is provided with teacher data (result (label)-bearing data) with respect to the machine learning device 2 that employs Q-learning (reinforcement learning) illustrated as FIG. 5.

The machine learning device 4 that employs supervised learning includes a state variable observation unit 41, a learning unit 42, and a decision unit 43, as illustrated as FIG. 7. The learning unit 42 includes an error computation unit 421 and a learning model update unit (error model update unit) 422. The error computation unit 421 and the learning model update unit 422 correspond to the reward computation unit 221 and the value function update unit 222, respectively, in the machine learning device 2 that employs Q-learning illustrated as FIG. 5. Note, however, that the error computation unit 421 in the present embodiment is different from the configuration described with reference to FIG. 5, in, e.g., a configuration which receives external teacher data and uses the learning model update unit 422 to update the learning model (error model) to reduce the difference between the teacher data and the learning model.

In other words, the error computation unit 421 receives teacher data and output from the state variable observation unit 41 and computes the error between the result (label)-bearing data and the learning model implemented in the learning unit 42. As the teacher data, when, for example, the same tasks are performed by the same industrial machine cell, label-bearing data obtained by the day before a predetermined day on which the tasks are actually performed can be held and provided to the error computation unit 421 as teacher data on the predetermined day.

Alternatively, data obtained through, e.g., simulation performed outside the industrial machine cell (e.g., a plurality of robots or machine tools) or label-bearing data obtained by another industrial machine cell may be provided as teacher data to the error computation unit 421 of the industrial machine cell via a memory card or a communication line. The teacher data (label-bearing data), for example, may even be held in a non-volatile memory such as flash memory built into the learning unit 42 and the label-bearing data held in the non-volatile memory can be directly used in the learning unit 42.

Figure 8:
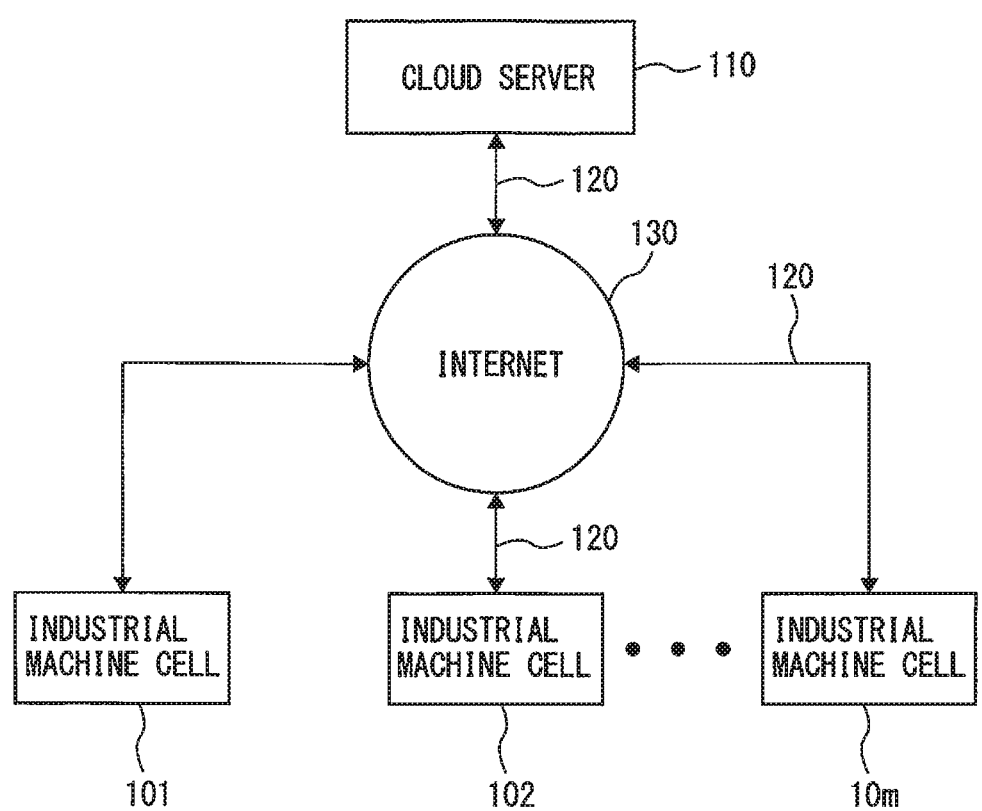
FIG. 8 is a block diagram illustrating an exemplary manufacturing system including a plurality of industrial machine cells.

FIG. 8 is a block diagram illustrating an exemplary manufacturing system including a plurality of industrial machine cells. As depicted as FIG. 8, the manufacturing system includes a plurality of industrial machine cells 101 to 10m, which are connected to each other via communication media 120 such as communication lines used on the Internet 130.

The machine learning devices 2 and 4 are provided in correspondence with the industrial machine cells 101 to 10m, and the machine learning devices 2 and 4 provided in correspondence with the industrial machine cells 101 to 10m are configured to share or exchange data with each other via the communication media 120. Referring to FIG. 8, the machine learning devices 2 and 4 provided in correspondence with the industrial machine cells 101 to 10m are located on a cloud server 110. Therefore, the industrial machine cells 101 to 10m may be located at geographically different locations.

Alternatively, the plurality of industrial machine cells 101 to 10m may be located at geographically close locations, so that data learned by the plurality of machine learning devices 2 and 4 provided to the respective industrial machine cells 101 to 10m can be shared or exchanged mutually by these machine learning devices via communication media (120) such as LANs (Local Area Networks).

As described in detail above, according to each embodiment of the present invention, task sharing among a plurality of industrial machines (e.g., a plurality of robots or a plurality of machine tools) in an industrial machine cell can be optimized using the machine learning techniques. Further, according to each embodiment of the present invention, for example, the machine learning device can learn and output task sharing (task ratio) that uniforms the load on each industrial machine, while maintaining the production volume within the industrial machine cell, and even learn and output task sharing for maximizing the production volume within the industrial machine cell.

The machine learning device according to the present invention may employ not only "reinforcement learning" or "supervised learning" but also a variety of machine learning techniques such as "unsupervised learning" or "semi-supervised learning."

With the machine learning device, the industrial machine cell, the manufacturing system, and the machine learning method according to the present invention, task sharing among a plurality of industrial machines can be optimized.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. A machine learning device for performing a task using a plurality of industrial machines and learning task sharing for the plurality of industrial machines, the device comprising:
   a processor configured to
      observe state variables of the plurality of industrial machines, and
      learn task sharing for the plurality of industrial machines, on the basis of the observed state variables,
   wherein when one of the plurality of industrial machines stops and the task is shared by other industrial machines of the plurality of industrial machines, the processor is configured to observe a change in a volume of production by the plurality of industrial machines and observe a task load on the stopped one of the plurality of industrial machines as zero, and
   the plurality of industrial machines perform the task based on the learned task sharing,
   wherein
   the processor is configured to observe the state variables including
      a task time from start to end of a series of tasks repeatedly performed by the plurality of industrial machines, and
      a task load on each of the plurality of industrial machines in an interval from the start to the end of the series of task, the task load being a power consumption of said each of the plurality of industrial machines, and
   the processor is configured to
      set a negative reward when the observed task load exceeds a predetermined allowable range,
      set a positive reward when the observed task time is shortened,
      set no reward when the observed task time is not shortened, and
      update an action value table that determines a value of work sharing for the plurality of industrial machines based on the reward.

2. The machine learning device according to claim 1, wherein the processor is configured to decide and issue, as a command, a sharing detail of the task for the plurality of industrial machines by referring to the learned task sharing.

3. The machine learning device according to claim 2, wherein
   the machine learning device is connected to each of the plurality of industrial machines via a network,
   the processor is configured to obtain the state variables of the plurality of industrial machines via the network, and
   the processor is configured to send the sharing detail of the task to the plurality of industrial machines via the network.

4. The machine learning device according to claim 1, wherein
   the processor is configured to observe the state variables further including at least one of
      a change in the volume of production by the plurality of industrial machines in an upstream process, or
      a change in the volume of production by the plurality of industrial machines upon the stop of the one of the plurality of industrial machines for maintenance performed periodically.

5. The machine learning device according to claim 1, wherein
   when said one of the plurality of industrial machines stops and the task is shared by the other industrial machines of the plurality of industrial machines, the processor is configured to learn task sharing for
      maintaining a volume of production by the other industrial machines of the plurality of industrial machines,
      averaging a load on each of the other industrial machines of the plurality of industrial machines, and
      maximizing a volume of the task performed by the other industrial machines of the plurality of industrial machines.

6. The machine learning device according to claim 1, wherein
   each of the plurality of industrial machines comprises a robot, and
   the plurality of robots is configured to perform the task on the basis of the learned task sharing.

7. A machine learning device for performing a task using a plurality of industrial machines and learning task sharing for the plurality of industrial machines, the device comprising:
   a processor configured to
      observe state variables of the plurality of industrial machines, and
      learn task sharing for the plurality of industrial machines, on the basis of the observed state variables,
   wherein when one of the plurality of industrial machines stops and the task is shared by other industrial machines of the plurality of industrial machines, the processor is configured to observe a change in a volume of production by the plurality of industrial machines and observe a task load on the stopped one of the plurality of industrial machines as zero, and
   the plurality of industrial machines perform the task based on the learned task sharing,
   wherein
   the processor is configured to observe the state variables including
      a task time from start to end of a series of tasks repeatedly performed by the plurality of industrial machines, and
      a task load on each of the plurality of industrial machines in an interval from the start to the end of the series of task, the task load being a power consumption of said each of the plurality of industrial machines, and
   the processor is configured to
      set a negative reward when the observed task load exceeds a predetermined allowable range,
      set a positive reward when the observed task time is shortened,
      set no reward when the observed task time is not shortened, and
      update a value function for determining a value of task sharing for the plurality of industrial machines on the basis of the observed state variables and the reward.

8. The machine learning device according to claim 1, wherein the machine learning device further comprises a neural network.

9. An industrial machine cell comprising the plurality of industrial machines; and the machine learning device according to claim 1.

10. A manufacturing system comprising a plurality of industrial machine cells according to claim 9, wherein
the machine learning devices are provided in correspondence with the industrial machine cells, and
the machine learning devices provided in correspondence with the industrial machine cells are configured to share or exchange data with each other via a communication medium.

11. The manufacturing system according to claim 10, wherein the machine learning devices are located on a cloud server.

12. A machine learning method for performing a task using a plurality of industrial machines and learning task sharing for the plurality of industrial machines, the method comprising:
observing state variables of the plurality of industrial machines;
learning task sharing for the plurality of industrial machines, on the basis of the observed state variables; and
when one of the plurality of industrial machines stops and the task is shared by other industrial machines of the plurality of industrial machines,
observing a change in a volume of production by the plurality of industrial machines and observing a task load on the stopped one of the plurality of industrial machines as zero,
wherein
the plurality of industrial machines perform the task based on the learned task sharing,
said observing comprises observing the state variables including
a task time from start to end of a series of tasks repeatedly performed by the plurality of industrial machines, and
a task load on each of the plurality of industrial machines in an interval from the start to the end of the series of task, the task load being a power consumption of said each of the plurality of industrial machines, and
the method further comprises
setting a negative reward when the observed task load exceeds a predetermined allowable range,
setting a positive reward when the observed task time is shortened,
setting no reward when the observed task time is not shortened, and
updating an action value table that determines a value of work sharing for the plurality of industrial machines based on the reward.

13. The machine learning method according to claim 12, wherein
said observing the state variables comprises observing the state variables including at least one of
an achievement level of a series of tasks performed by the plurality of industrial machines, or
a difference in task volume in each of the plurality of industrial machines.

14. The machine learning device according to claim 1, wherein
the processor is configured to observe the state variables including at least one of
an achievement level of a series of tasks performed by the plurality of industrial machines, or
a difference in task volume in each of the plurality of industrial machines.

* * * * *